(12) United States Patent
Neuhaus

(10) Patent No.: US 7,963,024 B2
(45) Date of Patent: Jun. 21, 2011

(54) METHOD OF MANUFACTURING A MAGNETIC WRITE HEAD FOR PERPENDICULAR MAGNETIC RECORDING

(75) Inventor: Aaron Neuhaus, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 857 days.

(21) Appl. No.: 11/870,371

(22) Filed: Oct. 10, 2007

(65) Prior Publication Data

US 2009/0097158 A1    Apr. 16, 2009

(51) Int. Cl.
*G11B 5/127* (2006.01)
*H04R 31/00* (2006.01)

(52) U.S. Cl. ............... 29/603.16; 29/603.13; 29/603.14; 29/603.15; 29/603.18; 216/62; 216/65; 216/66; 360/121; 360/122; 360/317; 451/5; 451/41

(58) Field of Classification Search ............... 29/603.07, 29/603.13–603.16, 63.18; 360/121, 122, 360/317; 427/127, 128
See application file for complete search history.

(56) References Cited

U.S. PATENT DOCUMENTS

| 4,672,493 | A | 6/1987 | Schewe | 360/125 |
| 7,440,229 | B2 * | 10/2008 | Sasaki et al. | 360/125.22 |
| 7,580,222 | B2 * | 8/2009 | Sasaki et al. | 360/125.06 |
| 2005/0111138 | A1 | 5/2005 | Yamakawa et al. | 360/126 |
| 2005/0128637 | A1 | 6/2005 | Johnston et al. | 360/125 |
| 2005/0280936 | A1 | 12/2005 | Sasaki et al. | 360/126 |
| 2005/0280937 | A1 | 12/2005 | Sasaki et al. | 360/126 |
| 2005/0280938 | A1 | 12/2005 | Sasaki et al. | 360/126 |
| 2005/0280939 | A1 | 12/2005 | Sasaki et al. | 360/126 |
| 2006/0002014 | A1 | 1/2006 | Sasaki et al. | 360/125 |
| 2006/0002020 | A1 | 1/2006 | Pokhil et al. | 360/126 |
| 2006/0061907 | A1 | 3/2006 | Sasaki et al. | 360/126 |
| 2006/0087765 | A1 | 4/2006 | Iwakura et al. | 360/125 |

FOREIGN PATENT DOCUMENTS

| DE | 4026316 | 3/1991 |
| EP | 0101352 | 2/1984 |

OTHER PUBLICATIONS

Ise et al., "High Writing-Sensitivity Single-Pole Head With Cusp-Field Coils" IEEE Transactions on Magnetics, vol. 36, No. 5, Sep. 2000.

* cited by examiner

*Primary Examiner* — Paul D Kim
(74) *Attorney, Agent, or Firm* — Zilka-Kotab, PC

(57) ABSTRACT

A method for manufacturing a magnetic write head for perpendicular magnetic data recording. The method allows an upper write coil to be formed directly on a conformally deposited layer of non-magnetic material such as alumina which has been deposited over a magnetic shaping layer and write pole. The method allows the write coil to be constructed without the need for the deposition of a thick alumina fill layer and subsequent chemical mechanical polishing. This, therefore, avoids the necessity of such a chemical mechanical polishing step.

9 Claims, 20 Drawing Sheets

METHOD OF MANUFACTURING A MAGNETIC WRITE HEAD FOR PERPENDICULAR MAGNETIC RECORDING

FIELD OF THE INVENTION

The present invention relates to perpendicular magnetic recording and more particularly to a method for manufacturing a write head, having a dual pancake write coil structure that is recessed between a trailing magnetic shield and a magnetic back gap layer.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air hearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, referred to as a spacer layer, sandwiched between first and second ferromagnetic layers, referred to as a pinned layer and a free layer. First and second leads are connected to the spin valve sensor for conducting a sense current there through. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \Theta$, where $\Theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

The manufacture of such perpendicular magnetic write heads is complex and involves many manufacturing steps, such as photolithographic masking processes, chemical mechanical polishing and material deposition. Any manufacturing process that can reduce the number or complexity of the manufacture of such write is of great advantage, in addition, a process or structure that can reduce the topography of the write head structure can improve write head performance and simplify manufacturing. There is, therefore, a need for a method for manufacturing a write head structure that can reduce the cost and complexity of manufacturing such a write head.

SUMMARY OF THE INVENTION

The present invention provides a method for manufacturing a magnetic write head for perpendicular magnetic data recording, which avoids the need for a thick alumina fill and chemical mechanical polishing before depositing an upper or second electrically conductive write coil. The method can include forming a magnetic shaping layer. Then, forming a magnetic write pole over the shaping layer. A magnetic trailing shield is formed over an end of the magnetic write pole the trailing shield being separated from the magnetic write pole by a non-magnetic trailing gap layer. Then, a thin layer of non-magnetic, electrically insulating material is conformally deposited; and an electrically conductive write coil is formed over the conformally deposited thin layer of non-magnetic, electrically insulating material without an intervening chemical mechanical polishing step.

A method according to the present invention advantageously avoids additional alumina fill and chemical mechanical polishing processes by forming the write coil directly onto the conformally deposited layer. This not only reduces manufacturing steps, it also advantageously reduces the height or topography of the write head.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
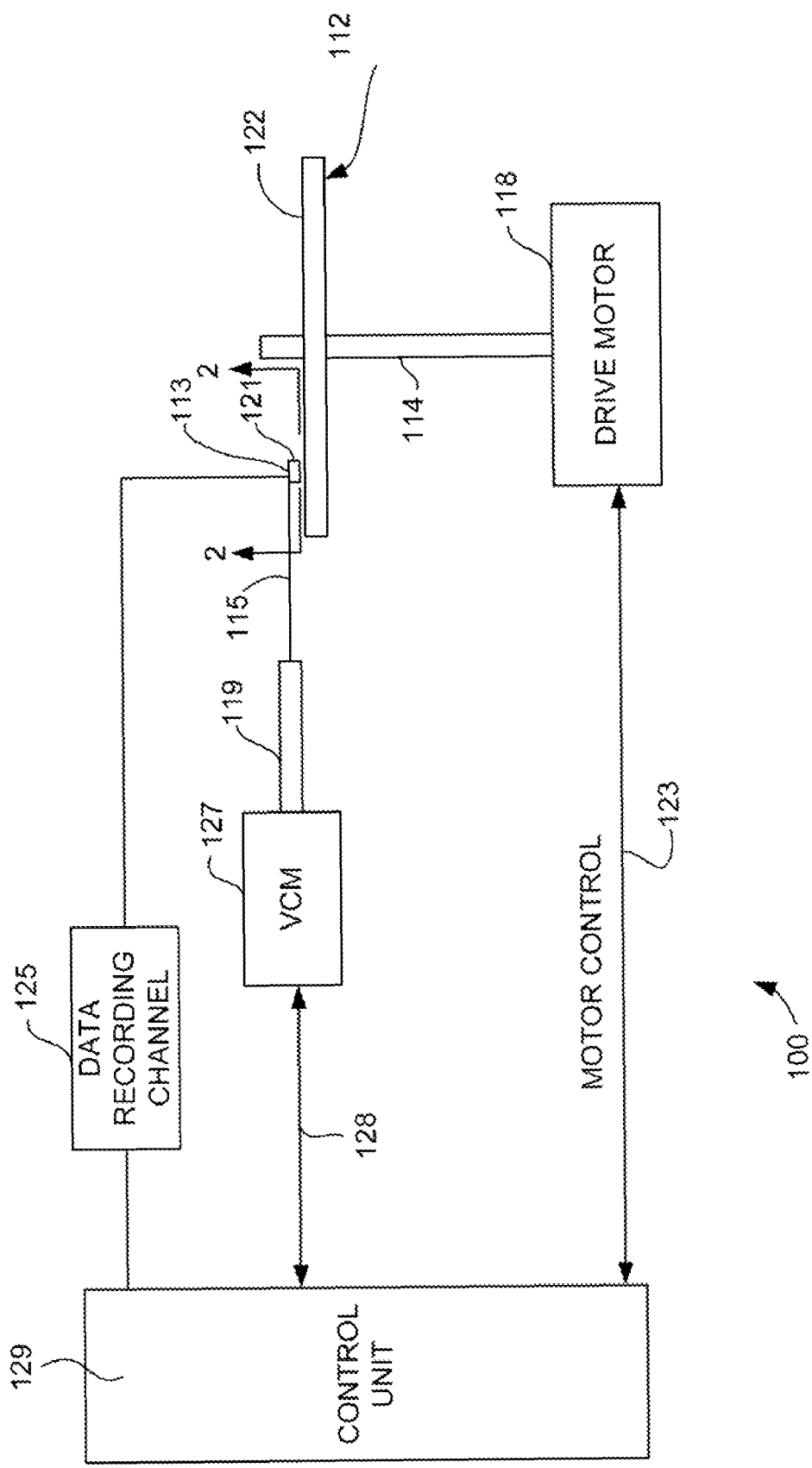
FIG. 1 is a schematic illustration of a disk drive system in which the invention might be embodied.

Referring now to FIG. 1, there is shown a disk drive 100 embodying this invention. As shown in FIG, 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
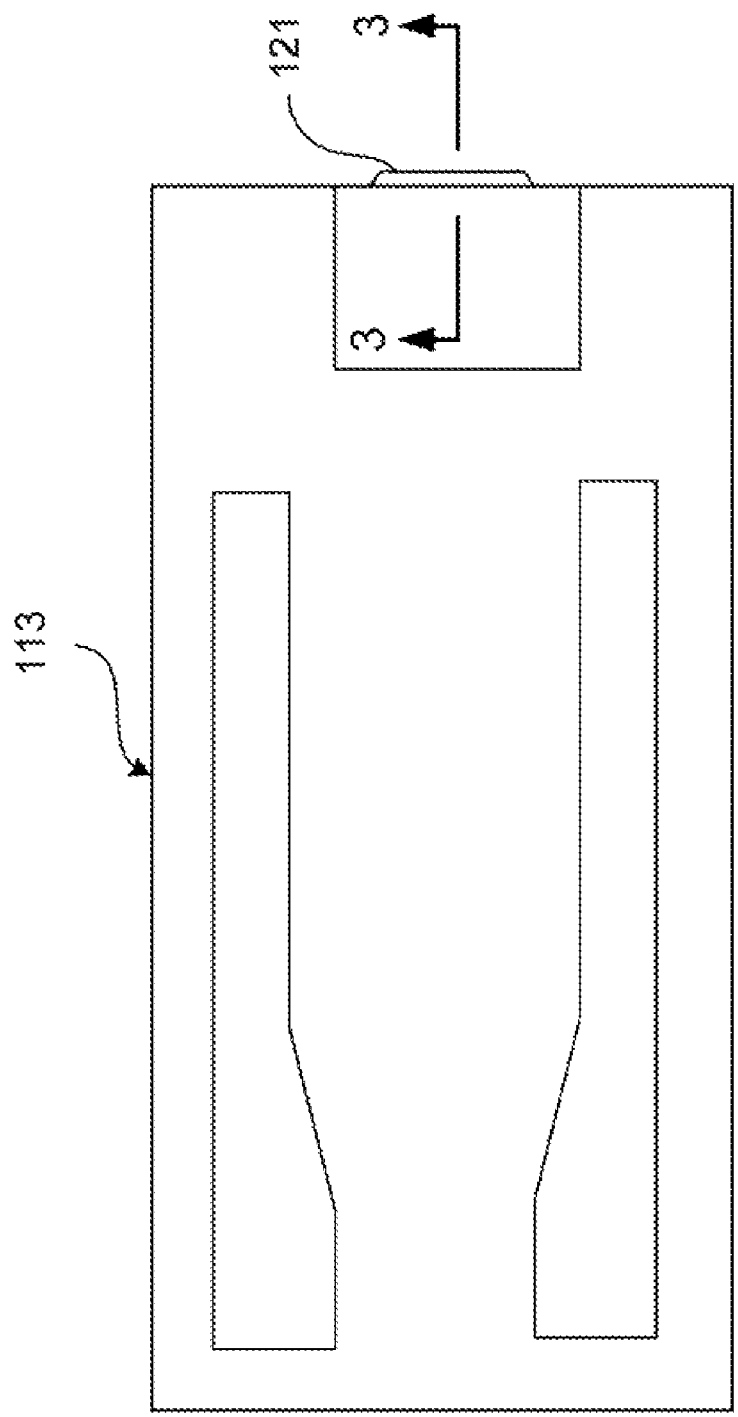
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read, sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
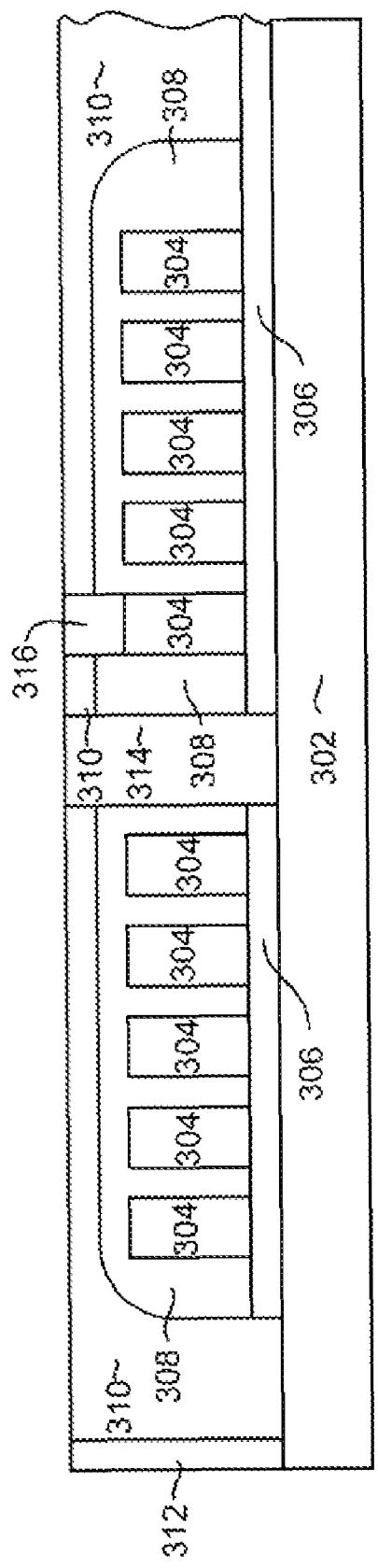
FIG. 3 is a cross sectional view view, taken from line 3-3 of FIG. 2 and rotated 90 degrees counterclockwise, of a magnetic write head according to an embodiment of the present invention.

With reference now to FIGS. 3-10 (which show a side view of a write head taken from line 3-3 of FIG. 2) a method of manufacturing a magnetic write head according to an embodiment of the invention is shown. With particular reference to FIG. 3, a magnetic return pole 302 is formed. A first coil 304, shown in cross section in FIG. 3, is formed over the return pole 302. The first coil layer 304 can sit upon an insulation layer 306 (such as alumina) that insulates it from the return pole 302 and can be embedded in a coil insulation layer 308 (such as hard baked photoresist). An insulating fill layer 310 can also be provided, surrounding the hard baked photoresist layer 308. A magnetic pedestal 312 can be formed at an end of the return pole 302 where an air bearing surface (ABS) will be formed. In addition, a magnetic back gap pedestal 314 can be formed to contact the return pole 302 in a region removed from the ABS end of the return pole 302. An electrically conductive center post layer 316 can be formed to contact a center portion of the coil 304 to provide electrical contact with the coil 304. A planarization process such as chemical mechanical polishing can be performed to form a planar surface 318.

Figure 4:
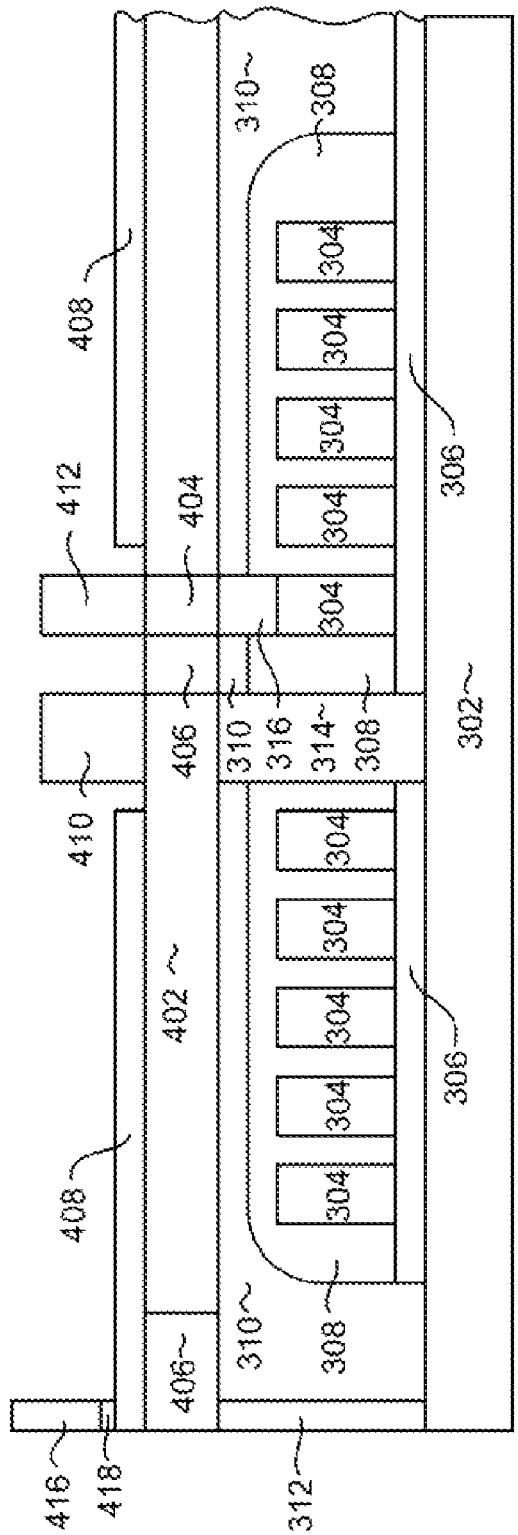
FIGS. 4-10 are cross sectional views of a magnetic write head in various intermediate stages of manufacture, illustrating a method of manufacturing a write head according to an embodiment of the invention.

With reference now to FIG. 4, a magnetic shaping layer 402 is formed over a portion of the surface 318, as well as an electrically conductive center post portion 404. And insulation fill layer 406, such as alumina, is deposited to fill areas not covered by the shaping layer 402 and center post 404. Another planarization step such as chemical mechanical polishing (CMP) can then be performed to planarize the surface of the layers 402, 406, 408. A magnetic write pole layer 408 is then formed, over the planarized surface of the layers 402, 406, 408. The write pole layer 408 can be formed as a lamination of layers of magnetic material separated by thin layers of non-magnetic material (not shown). A second magnetic back gap pedestal, can be formed over the back end of the shaping layer 402, and can be constructed of a magnetic material such as NiFe or CoFe. Another coil center post 412 constructed of an electrically conductive material such as Co, NiFe, CoFe, etc. can be formed over the center post layer 404.

In order to improve the field gradient of the write head, a magnetic trailing shield 414 can be formed over the write pole layer 408 at the ABS end of the write pole 408. A nonmagnetic trailing gap layer 416 separates the trailing shield 414 front the write pole 408. The trailing shield can be a pure trailing shield or could be a wrap around trailing shield, having side portions that extend down the sides of the write pole (not shown).

Figure 5:
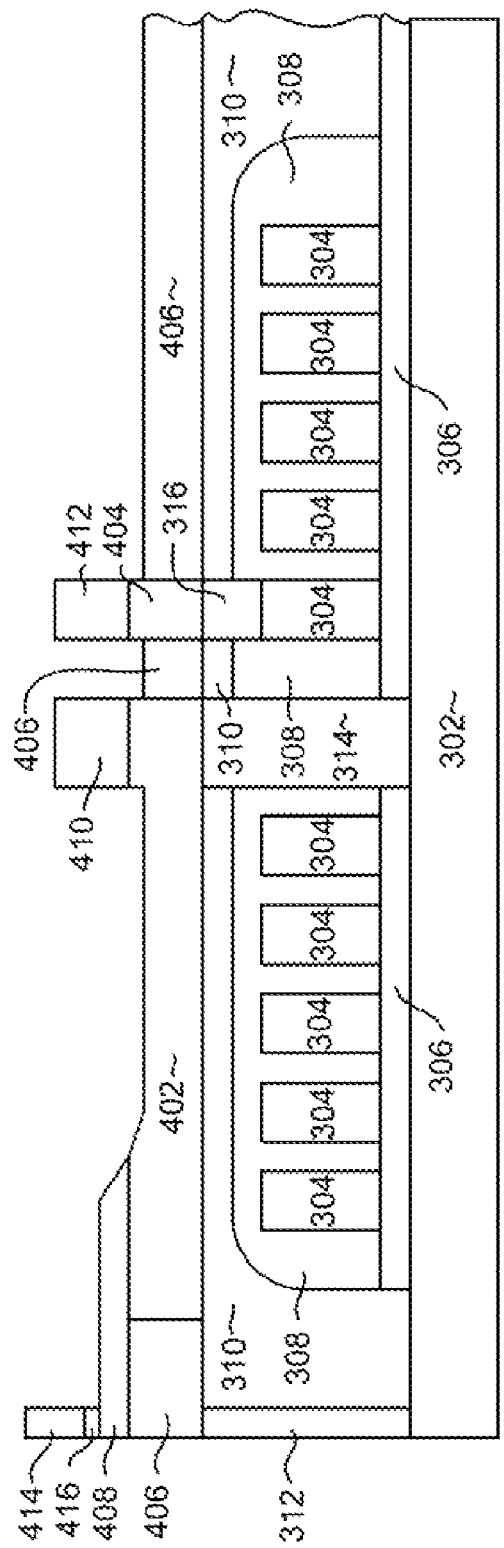

With reference now to FIG. 5, a masking and milling process can be performed to remove unwanted portions of the write gap layer 408. The masking and milling process can involve first forming a mask structure that can include a patterned photoresist layer and also possibly one or more hard mask layers, a non-photosensitive layer of polyimide such as DURAMIDE® and an anti-reflective coating layer (ARC). The mask structure (not shown) can be formed to cover an area where the write pole material 408 is desired in order to define a write pole. Then a material removal process such as ion milling or reactive ion milling (RIM) can be performed to remove portions of the write pole material 408 that are not protected by the mask layer. This results in a structure as shown in FIG. 5 having a defined write pole 408.

Figure 6:
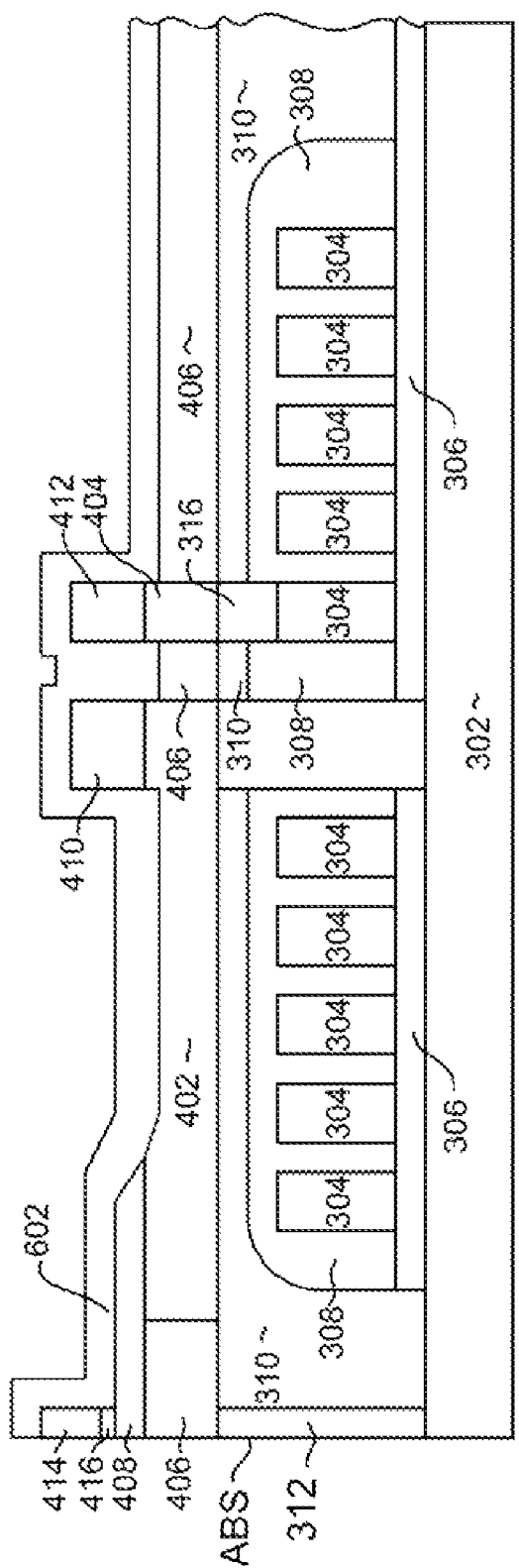

With reference now to FIG. 6, a thin layer of non-magnetic, electrically insulating material is deposited. Although various materials could be used, the layer 602 is preferably alumina, deposited by a conformal deposition process such as atomic layer deposition (ALD) chemical vapor deposition (CVD), etc. Therefore, the layer 602 will be referred to herein as ALD layer 602. The ALD layer 602 can have a thickness of 30-500 nm.

Figure 7:
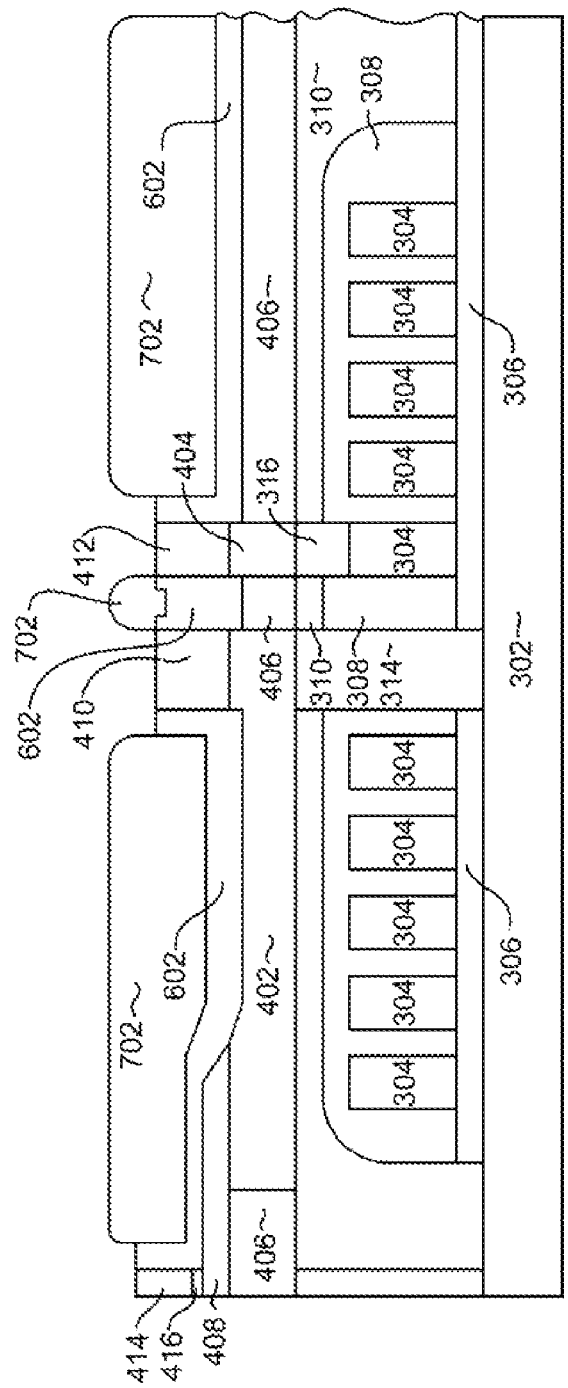
Figure 8:
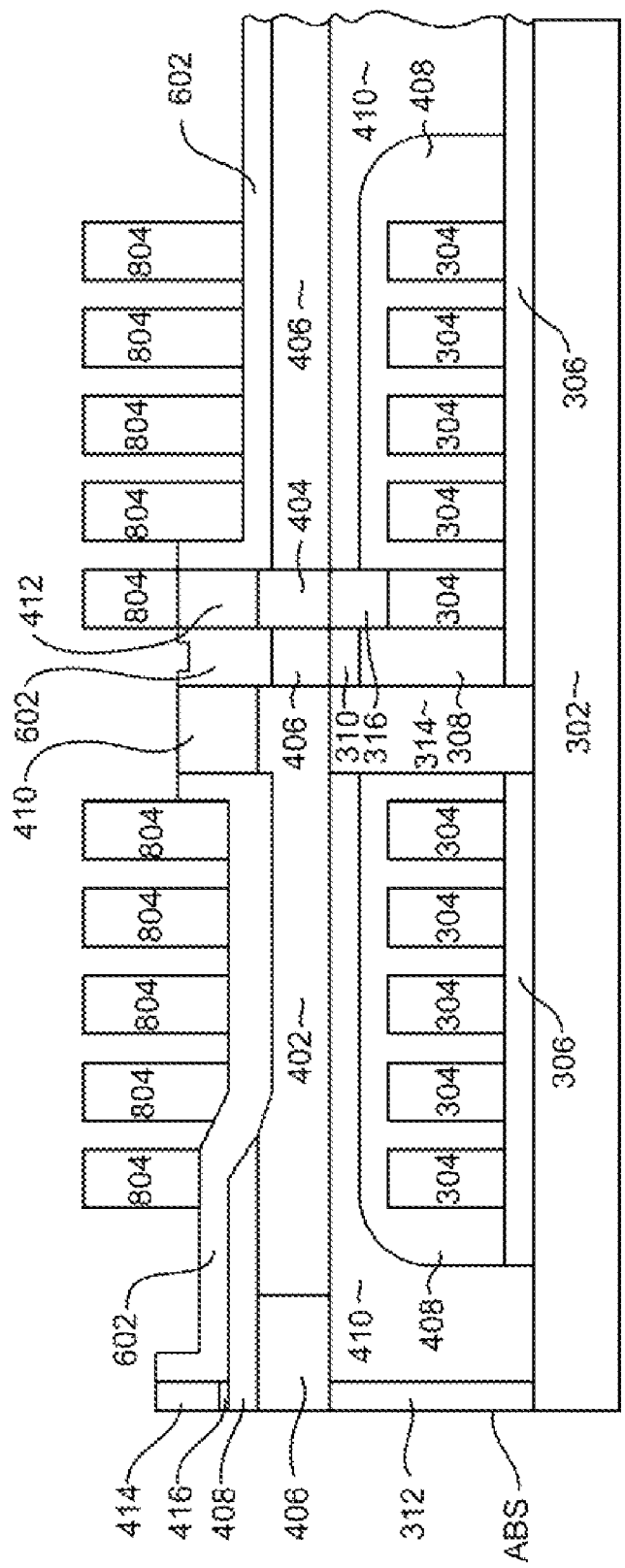

With reference now to FIG. 7, a process that involves masking and reactive ion milling (RIM) is performed to remove portions of the ALD layer 602 from over the trailing shield 414 back gap pedestal 4110 and center post 412, thereby exposing the layers 414, 410, 412. This masking and milling process can involve photolithographically defining a mask 702 over areas where the ALD layer 602 is not to be removed. A reactive ion milling process is then performed to remove portions of the ALD layer 602 that are not protected by the mask 702.

The mask 702 can then be removed. Then, with reference to FIG. 8 a photolithographic masking process and a plating process are performed to form an electrically conductive second coil layer 802 over the remaining ALD layer 602. It should be pointed out that the coil layer 802 is formed directly over the ALD layer 602 without a chemical mechanical polishing step (CMP) having been perforated on the ALD layer 602. This is fundamentally different from previous processes wherein a thick insulating fill layer would be deposited, and then a chemical mechanical polishing process performed to planarize the insulating fill layer and expose the back gap, center tap and trailing shield. A process according to the present invention advantageously eliminates this additional CMP step. In addition, because of the coil layer is deposited into the lower elevation of the as deposited ALD layer, the bottom of the coil sits at a lower elevation in the head build. This allows the coil to be built taller than was possible with prior art manufacturing methods, thereby decreasing the electrical resistance of the coil and also the accompanying heat generation.

Figure 9:
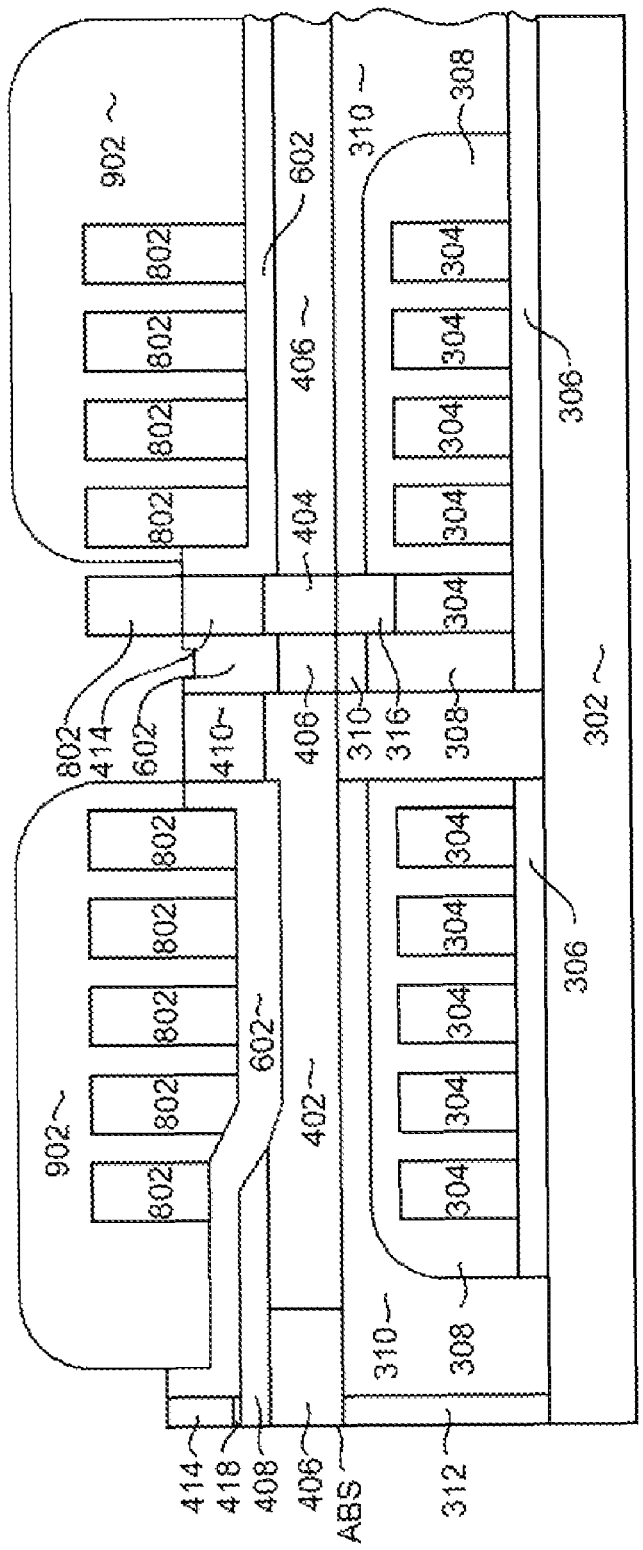
Figure 10:
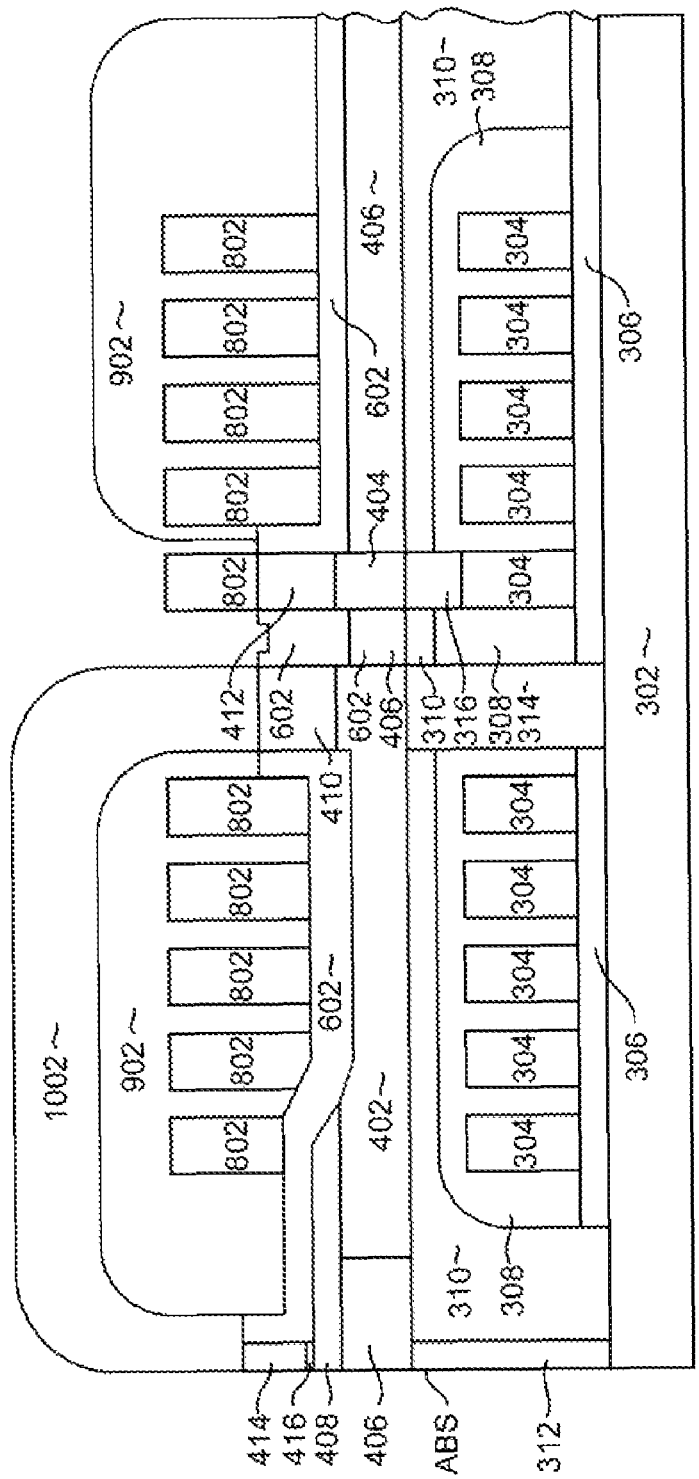

With reference now to FIG. 9, a layer of photoresist 902 is patterned over the second coil 802 and is hard baked to form a rounded hard baked coil insulation layer 902. the hard baked photoresist layer 902 is formed so as to leave a portion of the innermost turn of the coil 802 exposed (i.e. over the center posts 316, 404, 412) in order to allow for electrical connection with the coil 802. Then, with reference to FIG. 10, a second (or trailing) magnetic return pole 1002 is formed to connect the trailing (or trailing-wrap-around) shield 414 with the back gap pedestal 410. This trailing return pole 1002 can be formed by forming a mask and electroplating a magnetic material such as NiFe or CoFe into an opening formed in the masks.

As can be seen, the above process results in a coil 1402 that is recessed below the top surfaces of the write gap layer 410 and trailing shield 414, in other words, the back gap 410 and the trailing shield 414 each has a top surface 1506, 1508 located in the trailing direction. The coil 1402, has a bottom surface 1510 (located in the leading direction) that is beneath the level of the top surfaces 1506, 1508 of the back gap 410 and trailing shield 414. This advantageously reduces the topography of the write head by recessing the coil between the back gap 410 and the trailing shield 414.

Figure 11:
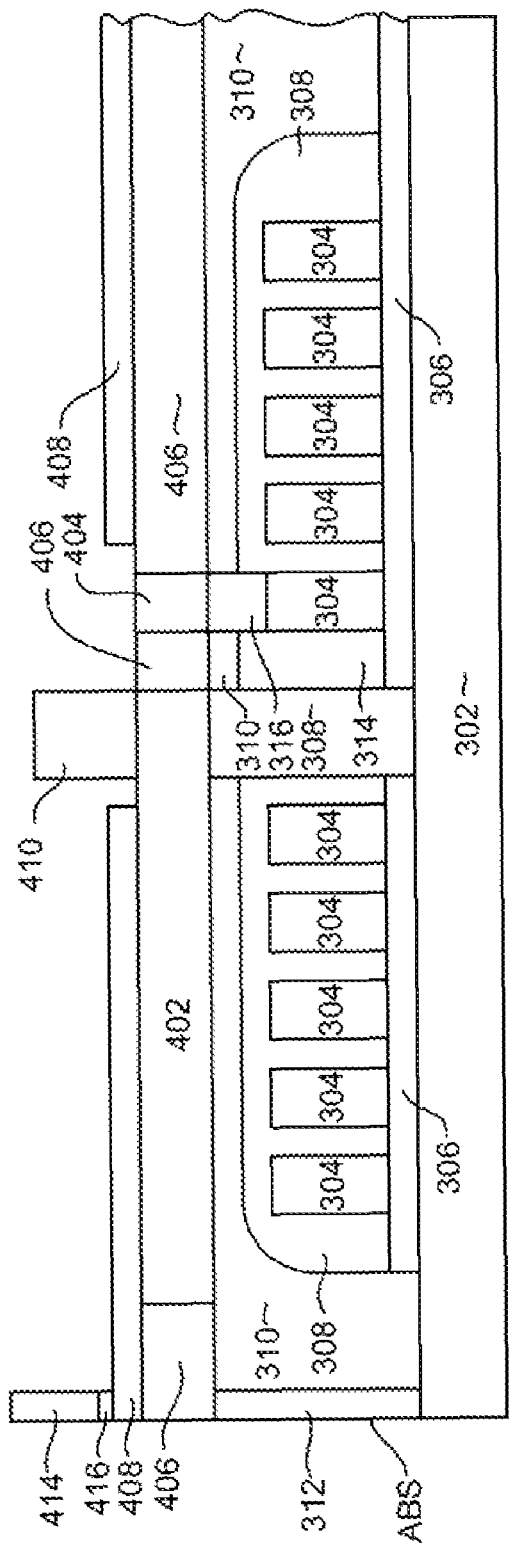
FIGS. 11-15 are cross sectional views of a magnetic write head in various intermediate stages of manufacture, illustrating a method of manufacturing a write head according to an alternate embodiment of the invention.

With reference now to FIGS. 11-15 a method for manufacturing a magnetic write head according to an alternate embodiment of the invention is described. According to this alternate embodiment of the invention, a write head can be constructed by starting with a structure such as that described with reference to FIG. 4. The structure of FIG. 11 is different from that discussed with reference to FIG. 4 in that the structure of FIG. 11 does not include the center post 412 that is shown in FIG. 4. In other words, the lower magnetic center post layer 404 is exposed and is the uppermost center post in the structure shown in FIG. 11.

Figure 12:
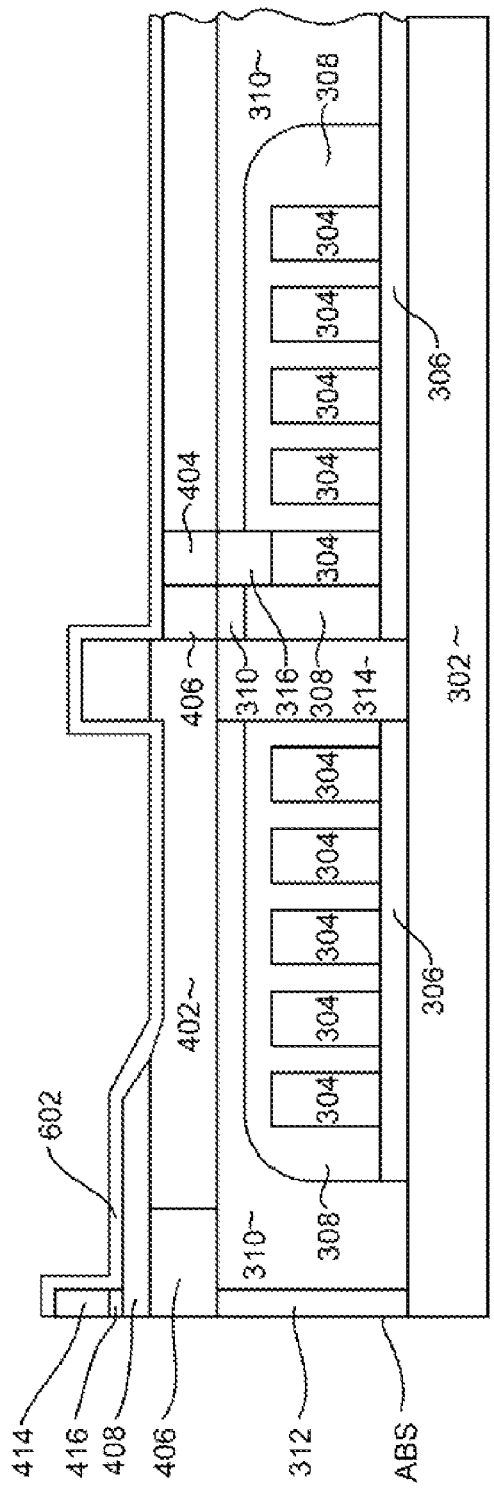
Figure 13:
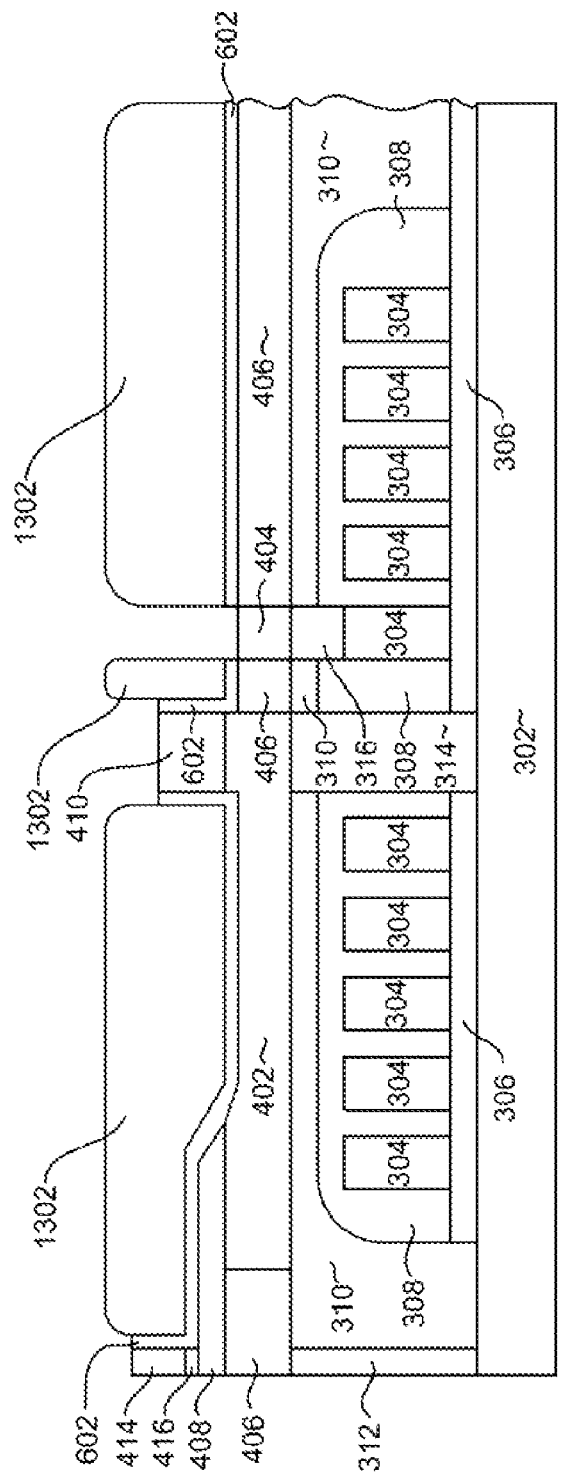
Figure 14:
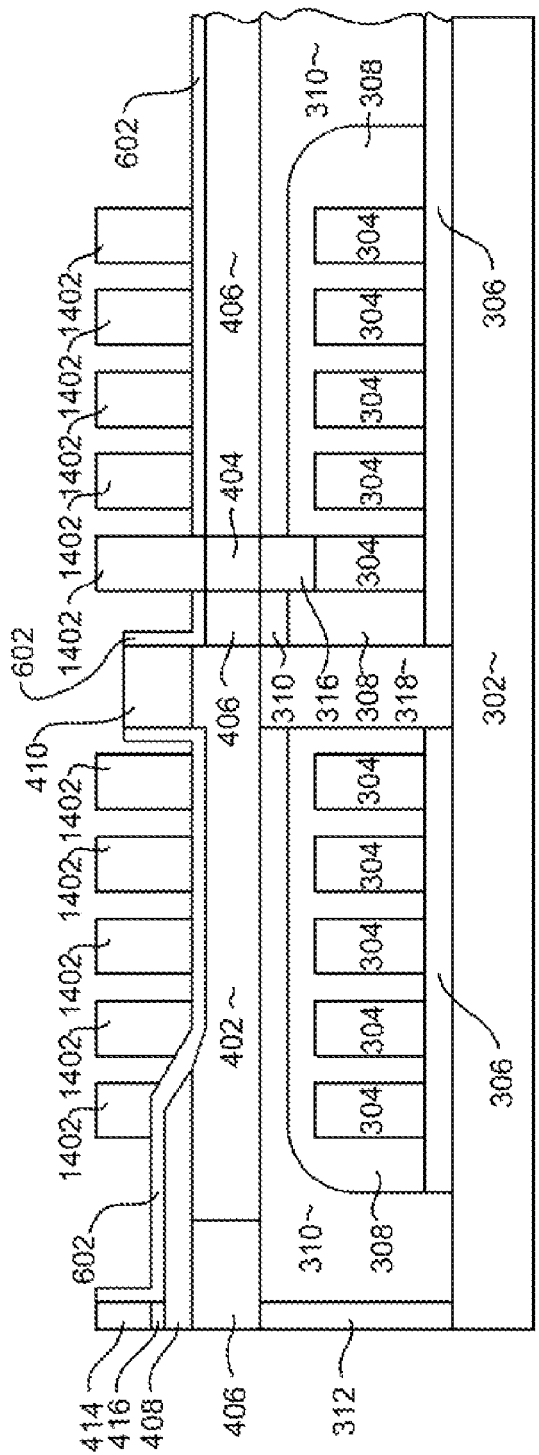

Then, with reference to FIG. 12, a thin layer of electrically insulating material (ALD layer) 602 such as alumina is deposited by a conformal deposition process such as atomic layer deposition, chemical vapor deposition, etc. Then, with reference to FIG. 13, a mask 1302 is formed and a reactive ion milling (RIM) is performed to remove exposed portions of the ALD layer 602 from areas over the trailing shield 414, back gap layer 410 and center post 404 in a manner similar to that described with reference to FIG. 7.

Figure 15:
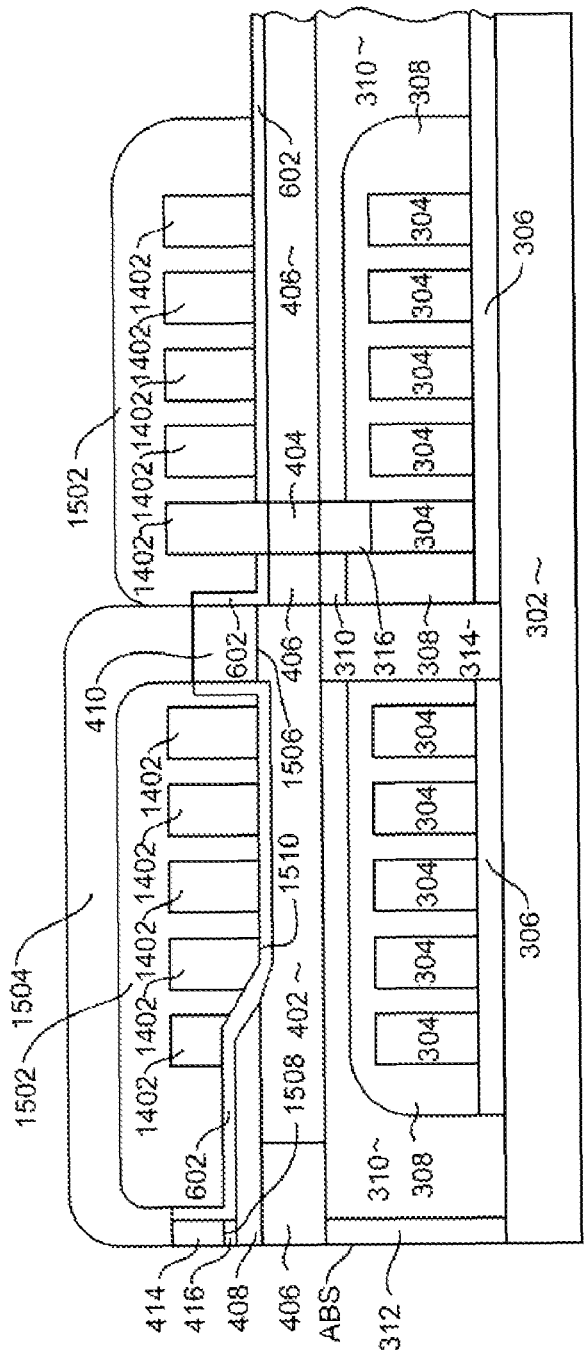

With reference now to FIG. 15, a layer of photoresist 1502 can be photolithograhically patterned and heated to form a hard baked photoresist layer 1502. Then, a trailing return pole 1504 can be formed by masking and electroplating, to contact the trailing shield 414 and the back gap layer 410.

It can be seen that the embodiment and described with reference to FIGS. 11-15 advantageously reduces the topography over which structures such as the coil 1402 and trailing pole 1504 are formed. This eases manufacture as well as reducing the over all topography of the write head.

Figure 16:
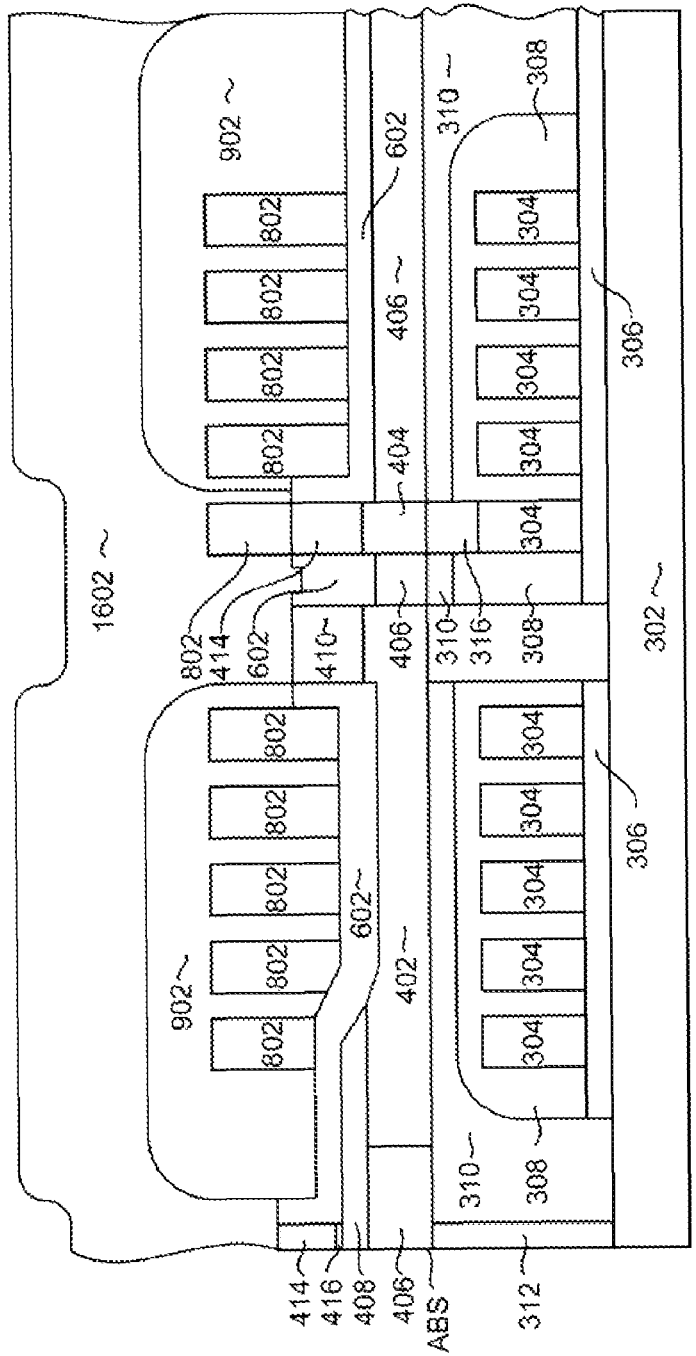
FIGS. 16-20 are cross sectional views of a magnetic write head in various intermediate stages of manufacture, illustrating a method of manufacturing a write head according to another embodiment of the invention.
Figure 17:
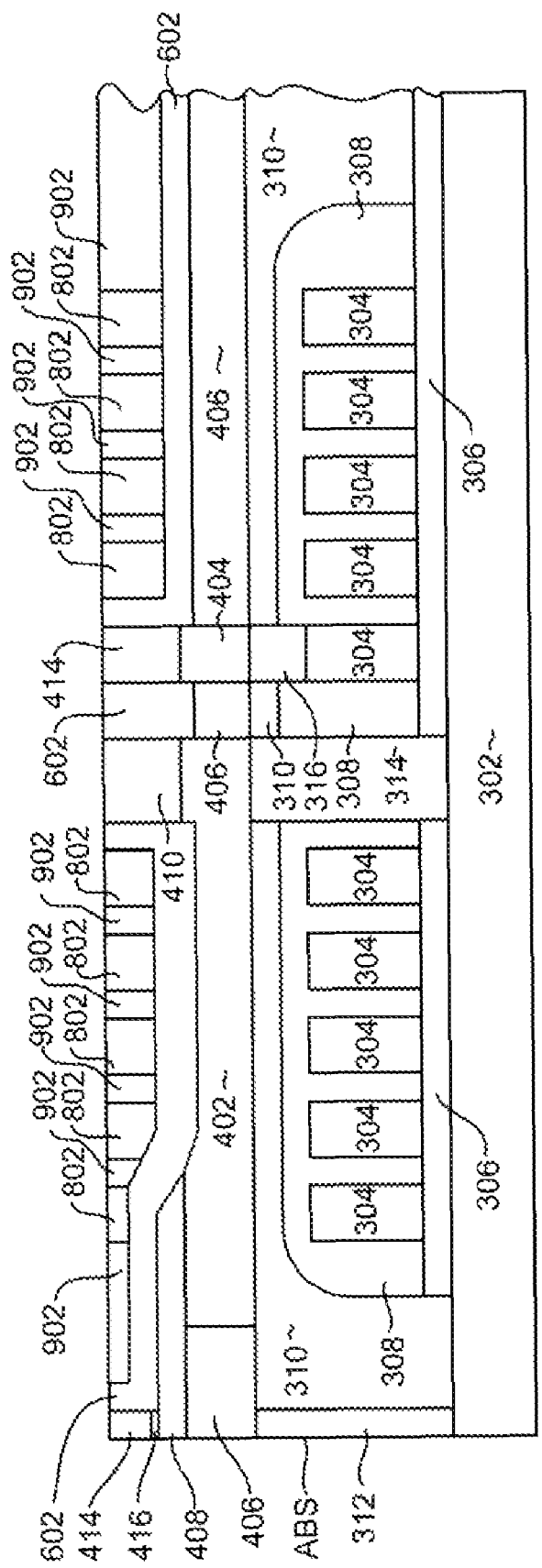
Figure 18:
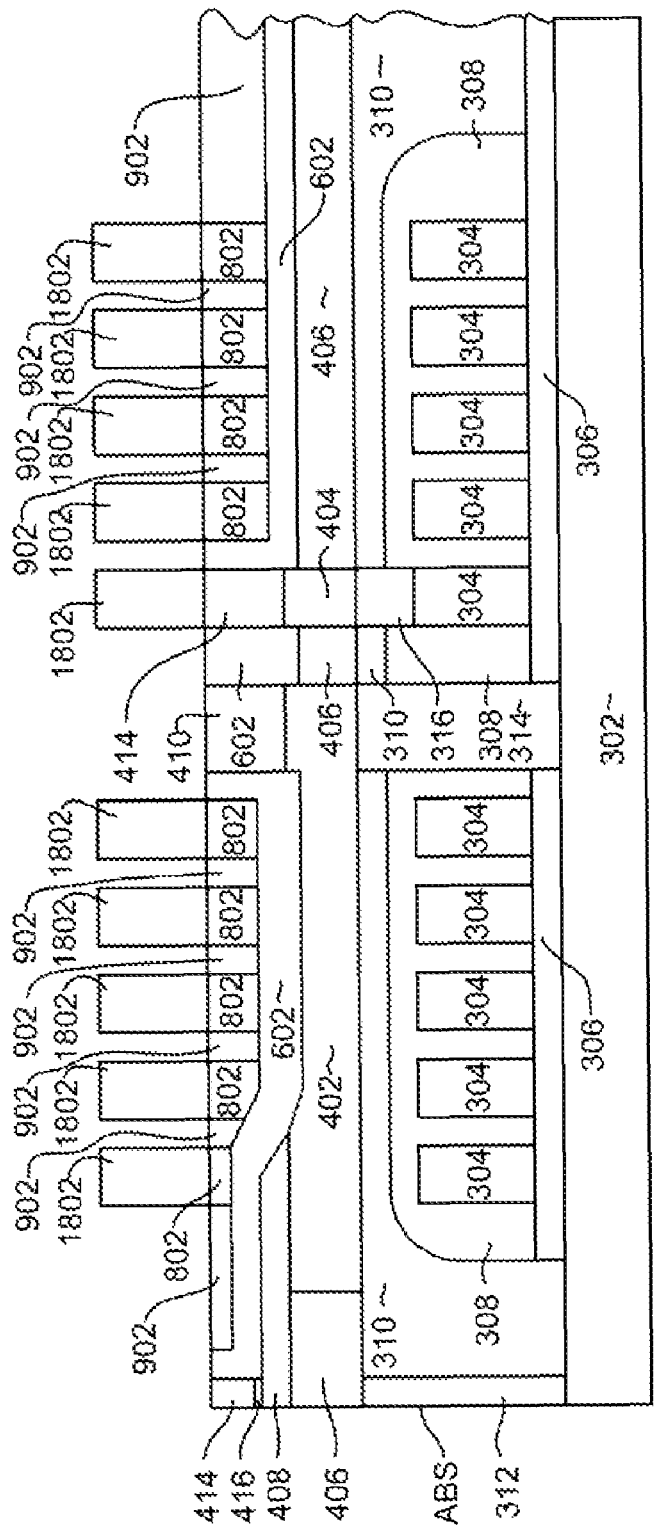

With reference now to FIGS. 16-20 a method for manufacturing a write head according to yet another embodiment of the invention is described. With particular reference to FIG. 16, a write head structure is constructed as shown. This structure 1602 is similar to the structure described with reference to FIG. 9 in that it has an upper coil structure 802 embedded in an insulation layer 902 such as a hard baked insulation layer 902. A layer of insulation fill material such as alumina 1602 is then deposited. Then, a chemical mechanical polishing process (CMP) is performed to remove a portion of insulating fill layer 1602, insulation layer 902 and coils 802 resulting in a planarized structure as shown in FIG. 17, with the trailing shield 414 back gap layer 410 and center post 412 exposed. Then, with reference to FIG. 18, a second layer 1802 is formed directly over the coil layer 802 to increase the height of the second coil 802. This increased coil height beneficially decreases the coil resistance and also decreases the heat dissipation from the coil 802.

Figure 19:
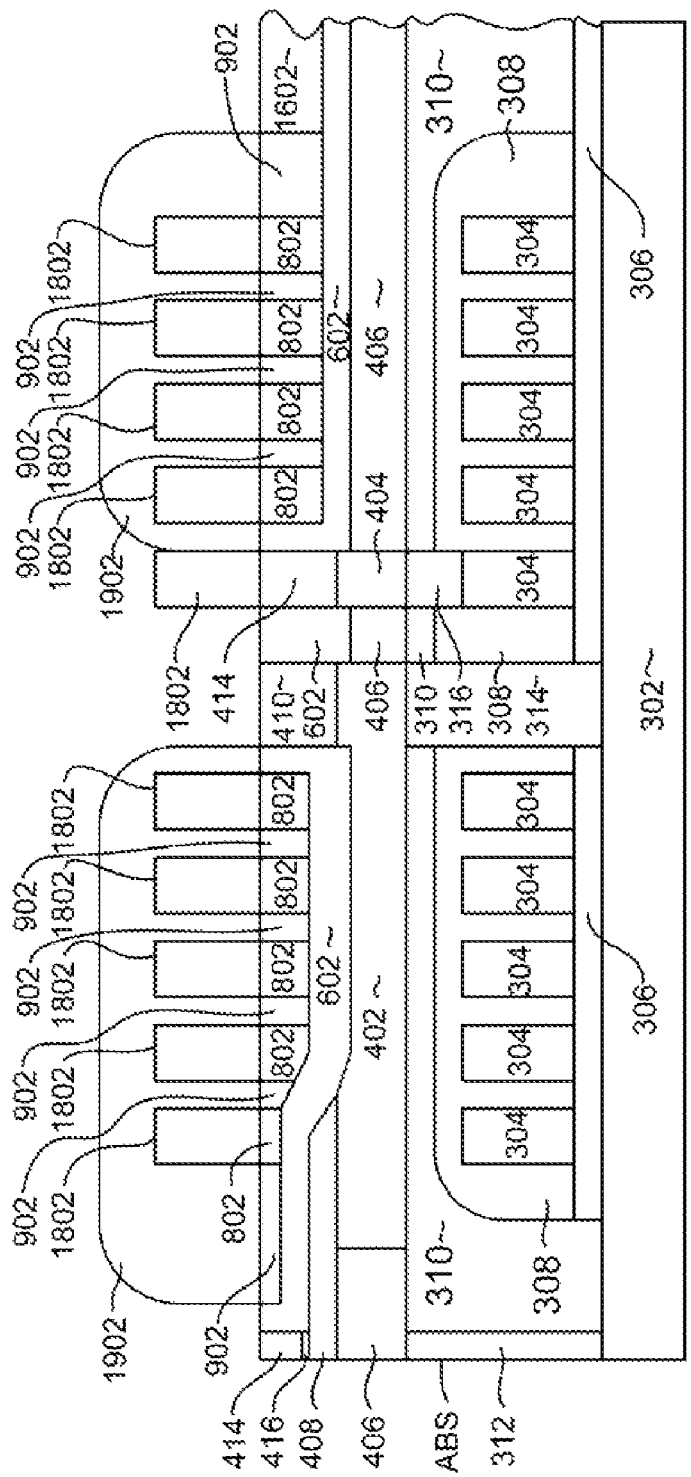
Figure 20:
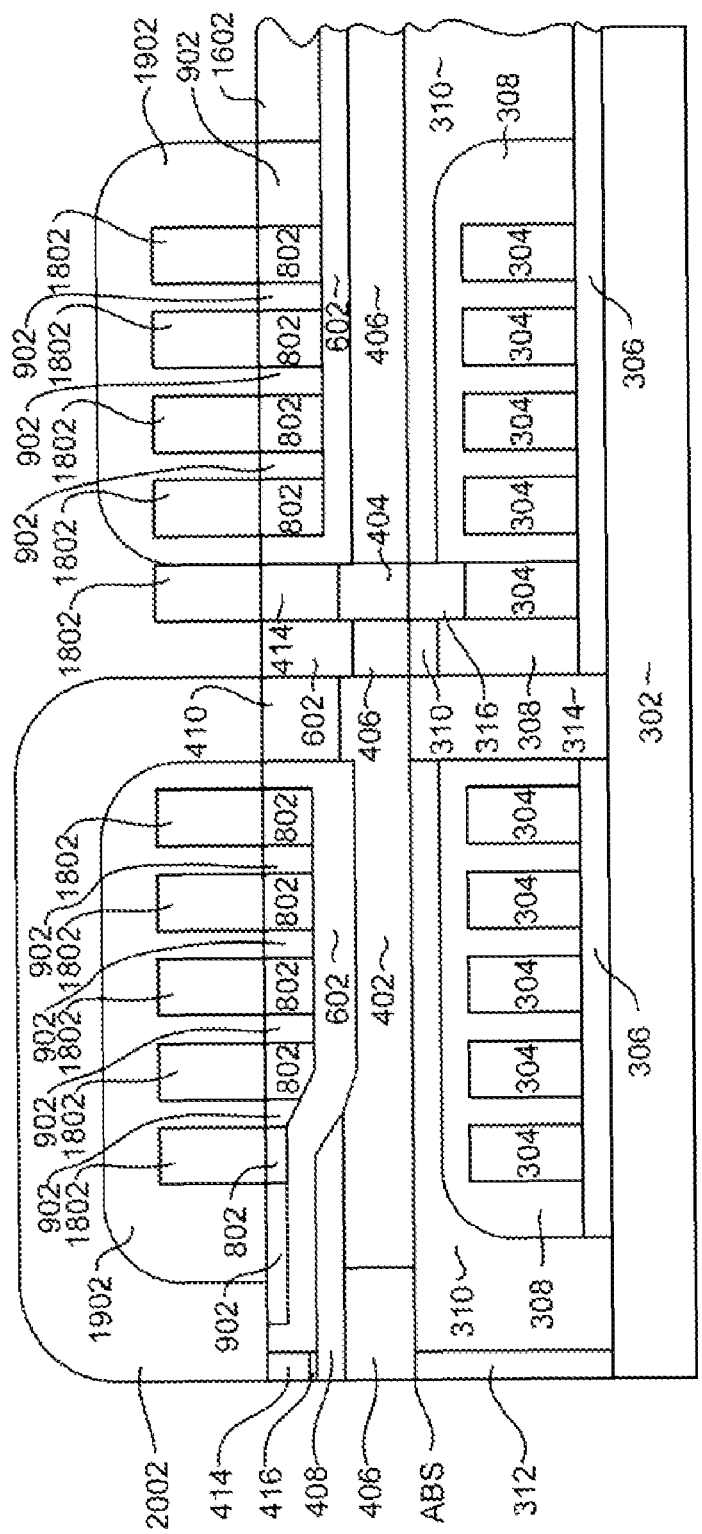

Then, with reference to FIG. 19, an insulation layer such as a hard baked photoresist layer 1902 is formed over the coils. Finally, with reference to FIG. 20, a return pole 2002 is formed to magnetically connect the trailing shield 414 with the back gap layer 410.

While various embodiments have been described, it should be understood that they have been presented by way of example only, and not limitation. Other embodiments falling Within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method of manufacturing a magnetic write head for perpendicular magnetic data recording, the method comprising:
    forming a magnetic shaping layer;
    forming a magnetic write pole over the shaping layer;
    forming a magnetic trailing shield over an end of the magnetic write pole, the trailing shield being separated from the magnetic write pole by a non-magnetic trailing gap layer;
    forming a magnetic back gap layer, magnetically connected with the magnetic shaping layer;
    conformally depositing a layer of non-magnetic, electrically insulating material;
    forming a mask structure, the mask structure having an opening over each of the trailing shield and the magnetic back gap layer;
    performing a reactive ion milling to remove portions of the conformally deposited layer of non-magnetic, electrically insulating material; and
    forming an electrically conductive write coil over the conformally deposited thin layer of non-magnetic, electrically insulating material without an intervening chemical mechanical polishing step.

2. A method as in claim 1 wherein the conformally depositing a layer of non-magnetic, electrically insulating material comprises depositing alumina by atomic layer deposition.

3. A method as in claim 1 wherein the conformally depositing a layer of non-magnetic, electrically insulating material comprises depositing alumina by chemical vapor deposition.

4. A method as in claim 1 wherein the conformally deposited layer of non-magnetic, electrically insulating material is deposited to at thickness of 50 to 300 nm.

5. A method for manufacturing a magnetic write head for perpendicular magnetic data recording, comprising:
    forming a first magnetic return pole;
    forming a first electrically conductive write coil over the first magnetic return pole, the first electrically conductive write coil being electrically isolated from the first magnetic return pole;
    forming a magnetic shaping layer over the electrically conductive write coil and the first return pole, the magnetic shaping layer being electrically isolated from the first electrically conductive write coil;
    forming a first electrically conductive center post that is electrically connected with a portion of the first electrically conductive write coil;
    forming a magnetic write pole over and in contact with the magnetic shaping layer;
    forming a trailing magnetic shield over a portion of the write pole;
    forming a magnetic back gap layer over a portion of the shaping layer;
    conformally depositing a layer of non-magnetic, electrically insulating material over the trailing shield, write pole back gap and center post;
    forming a mask structure over the conformally deposited layer, the mask structure having an opening over each of the trailing shield, back gap, and center post;
    performing a reactive ion milling to remove portions of the conformally deposited, non-magnetic, electrically insulating material;
    removing the structure; and
    forming a second write coil over the conformally deposited, non-magnetic, electrically insulating layer.

6. A method as in claim 5 wherein the second write coil is formed without an intervening chemical mechanical polishing process being performed between the conformal deposition of the non-magnetic, electrically insulating layer and the formation of the second write coil.

7. A method as in claim 5 wherein the conformally depositing a layer of non-magnetic, electrically insulating material over the trailing shield, write pole back gap and center post, further comprises depositing alumina by atomic layer deposition.

8. A method as in claim 5 wherein the conformally depositing a layer of non-magnetic, electrically insulating material over the trailing shield, write pole back gap and center post further comprises depositing alumina by chemical vapor deposition.

9. A method as in claim 5 wherein the conformally deposited layer of non-magnetic, electrically insulating material is deposited to a thickness of 50-300 nm.

* * * * *

UNITED STATES PATENT AND TRADEMARK OFFICE
CERTIFICATE OF CORRECTION

| | | |
|---|---|---|
| PATENT NO. | : 7,963,024 B2 | Page 1 of 1 |
| APPLICATION NO. | : 11/870371 | |
| DATED | : June 21, 2011 | |
| INVENTOR(S) | : Neuhaus | |

It is certified that error appears in the above-identified patent and that said Letters Patent is hereby corrected as shown below:

In the Specification:

Column 1, line 38, delete "hearing surface" and insert --bearing surface--;

Column 5, line 44, delete "perforated" and insert --performed--.

Signed and Sealed this
Twenty-first Day of July, 2015

Michelle K. Lee
*Director of the United States Patent and Trademark Office*